US007228226B1

(12) United States Patent
Munro et al.

(10) Patent No.: US 7,228,226 B1
(45) Date of Patent: Jun. 5, 2007

(54) METHOD AND SYSTEM FOR ANALYZING COMMUTING ROUTES

(75) Inventors: Jillian Paige Munro, Maplewood, NJ (US); Ford Mackinnon Stewart, Maplewood, NJ (US); Patrick Anthony Alessi, Howard Beach, NY (US)

(73) Assignee: Lehman Brothers Inc., New York, NY (US)

( * ) Notice: Subject to any disclaimer, the term of this patent is extended or adjusted under 35 U.S.C. 154(b) by 0 days.

(21) Appl. No.: 11/605,616

(22) Filed: Nov. 29, 2006

(51) Int. Cl.
*G06F 7/00* (2006.01)

(52) U.S. Cl. ...................... 701/202; 701/209; 701/210; 340/995.14

(58) Field of Classification Search ........ 701/200–213; 340/988–995.28; 705/13
See application file for complete search history.

(56) References Cited

U.S. PATENT DOCUMENTS 5,978,730 A * 11/1999 Poppen et al. .............. 701/202
5,987,375 A * 11/1999 Tamai ........................ 701/200
7,092,818 B2 * 8/2006 Ohler ......................... 701/209

* cited by examiner

*Primary Examiner*—Richard M. Camby
(74) *Attorney, Agent, or Firm*—Morgan, Lewis & Bockius LLP

(57) ABSTRACT

A method and system for analyzing commuting routes. Several items of information are received, including an identifier associated with an individual, an employment location for the individual, a mode of transportation used by the individual to travel to the employment location, and a segment associated with the mode of transportation. The identifier, the employment location, the mode of transportation and the segment are associated. The association is stored as route information. One or more of home location information for the individual, building access data for the individual, indicative information for the individual, and contact information for the individual are accessed. The route information is analyzed in combination with one or more of the home location information, the building access data, the indicative information, and the contact information to determine an impact on the individual of an incident effecting one or more of the employment location, the mode of transportation, and the segment.

6 Claims, 6 Drawing Sheets

302

METHOD AND SYSTEM FOR ANALYZING COMMUTING ROUTES

FIELD OF THE INVENTION

The present invention relates to conducting surveys relating to modes of transportation used by individuals associated with an organization to travel to and from their place of employment.

BACKGROUND OF THE INVENTION

Most employers do not maintain information on major transportation legs for the locations in which they do business (e.g., bus or train routes, major bridges/tunnels, driving). Further, they generally are not aware of their employee commutation patterns, either regular or alternate routes. Without this information, employers are not able to prepare for or adequately respond to major interruptions in transit service or identify employees impacted by an incident on a particular route.

SUMMARY OF THE INVENTION

The present invention is directed to a method and system in which several items of information are received, including an identifier associated with an individual, an employment location for the individual, a mode of transportation used by the individual to travel to the employment location, and a segment associated with the mode of transportation. The identifier, the employment location, the mode of transportation and the segment are associated. The association is stored as route information. One or more of home location information for the individual, building access data for the individual, indicative information for the individual, and contact information for the individual are accessed. The route information is analyzed in combination with one or more of the home location information, the building access data, the indicative information, and the contact information to determine an impact on the individual of an incident effecting one or more of the employment location, the mode of transportation, and the segment.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
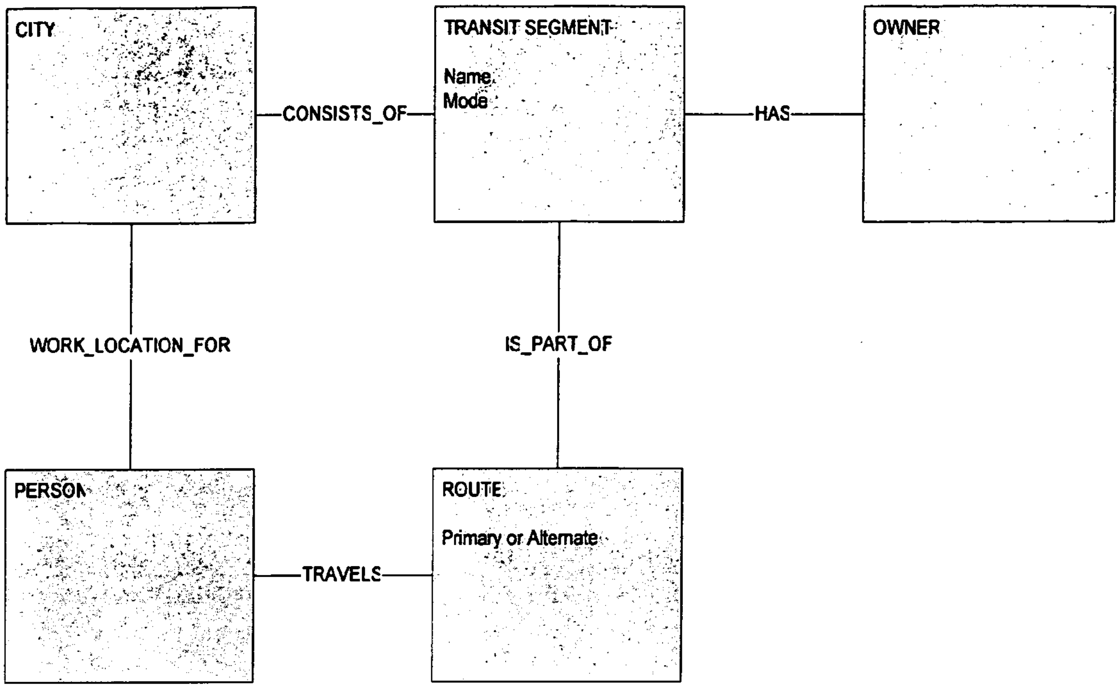
FIG. 1 illustrates an exemplary data model that may be used in accordance with a preferred embodiment of the present invention.

Reference will now be made in detail to the preferred embodiments of the present invention, examples of which are illustrated in the accompanying drawings.

The transportation survey of the present invention is a tool that can be used to collect transit information on employees and consultants working for an organization at a given time. Individuals map out their primary and alternate transportation modes by identifying major legs of their journey. The data is stored centrally as relationships, thereby allowing different views of the information. The present invention provides many advantages, including providing an organization with the ability to view quickly individuals who could be impacted by an incident affecting a transportation segment. In addition, the solution provides the ability to join employee transit information with other types of data regularly maintained in the employer's system, including employee work location (primary and alternate locations), employee home location, and building access data (gate entry swipes indicating ingress and egress), employee indicative information (i.e., information about a person as it relates to his or her employment with the firm, e.g., division and department within an organization) and employee contact information (e.g., work number, home number) to provide robust recovery information.

In a preferred embodiment, the survey application taps into an organization's central data repository containing information on its employees and contractors. For national or global companies, it can be customized by city or location. From the user's perspective, the application can be personalized and is easy to recall in order to allow for making modifications. Similarly, the application can be set to remind users to review periodically their profile to ensure its continued accuracy. Further, to protect the privacy of employees and contractors, route information is tightly entitled, while segment information may be widely available within an organization.

In connection with the survey, transportation segments are defined for a given city. Modes of transportation are defined as a property on each segment and provide a way of categorizing segments to make it more intuitive for users to select their segment. For example, in New York, the A subway line may have a segment. The A line is set up as a segment with the mode defined as subway. Any additional subway lines are also set up with the same mode. When a user defines his transportation profile, he selects the mode (e.g., subway), then the appropriate segments (e.g., A line, C line etc.) appear for him to select. A segment is associated with only one mode of transportation.

Transportation segments are agnostic to direction, in the preferred embodiment. They represent the line in its entirety, and do not individually represent an inbound or outbound direction. Transportation segments may be related to more than one city. In those cases, the segment becomes available for anyone whose work location is one of those cities. For example, for a train line that runs between Boston and New York, given that segments do not represent direction, the train line could be a commuting path for someone whose work location is New York or someone whose work location is Boston. In this case, the train line would be related both to Boston and to New York.

The transportation profile represents an individual's set of commuting routes. Each person identifies a primary route, which is his most common mode and path. Individuals can add as many alternate routes as is appropriate. To add a route, the correct metropolitan area is selected and the application defaults to the home area based on the user's profile. The mode of transportation is selected and, finally, the correct segment is selected. Once the user has added the entire route, the segments can be ordered/re-ordered. The profile also allows a person to flag that he does not wish to provide his transportation information. This information is stored and can be used to filter those individuals out when reviewing the responses. Finally, in the event of an incident in which public transportation is unavailable, the profile maintains information regarding whether an individual has access to a vehicle. This data is stored along with the transportation profile and can be used when reviewing the responses.

The information gathered by way of the application may be viewed in a grid that allows sorting and filtering of data based on a number of parameters, including segment, division, department, and work location. A transportation mode or line can be selected, which retrieves all people who have selected that mode or line in their profile.

The data representing the pairing of a person to a transportation segment is stored in a table in accordance with name/value pairs, with limited entitlements so as not to expose sensitive personal information to the general populous. An exemplary data model for the application is shown in FIG. 1. A city is associated with a transit segment, which is described by a name and a mode of transportation. Each transit segment is associated with an owner, who has responsibility for ensuring that all transit segments are accurate and up to date for a given city. A city is the work location for a person, who is associated with one or more (i.e., primary and/or alternate) travel routes.

Figure 2:
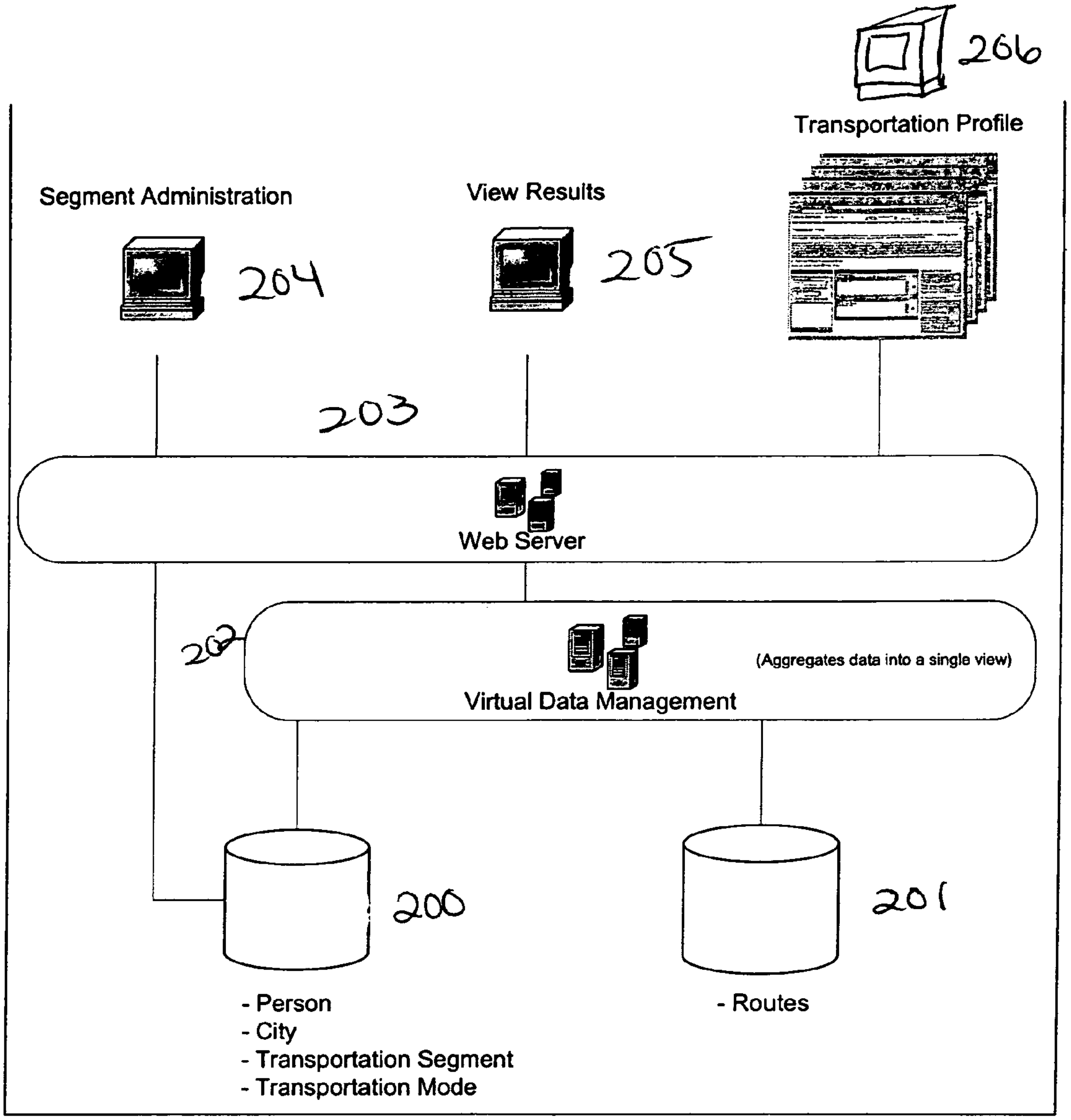
FIG. 2 illustrates an exemplary architecture for implementing a preferred embodiment of the present invention.

An exemplary architecture for supporting the present invention is illustrated in FIG. 2. Client 204 may be used to administer segment information. Client 205 may be used to view results of the survey. Client 206 may be used by employees and consultants to complete their transportation profiles. Information regarding a person, his city, transportation segments and modes may be maintained in database 200; the information contained in such database 200 may be available generally to individuals throughout the organization. In contrast, database 201, which maintains route information, is highly entitled and only limited access is provided to authorized individuals within the organization. Access to such information may be gained via web server 203, through use of a virtual data management system 202, which aggregates data into a single view.

Figure 3:
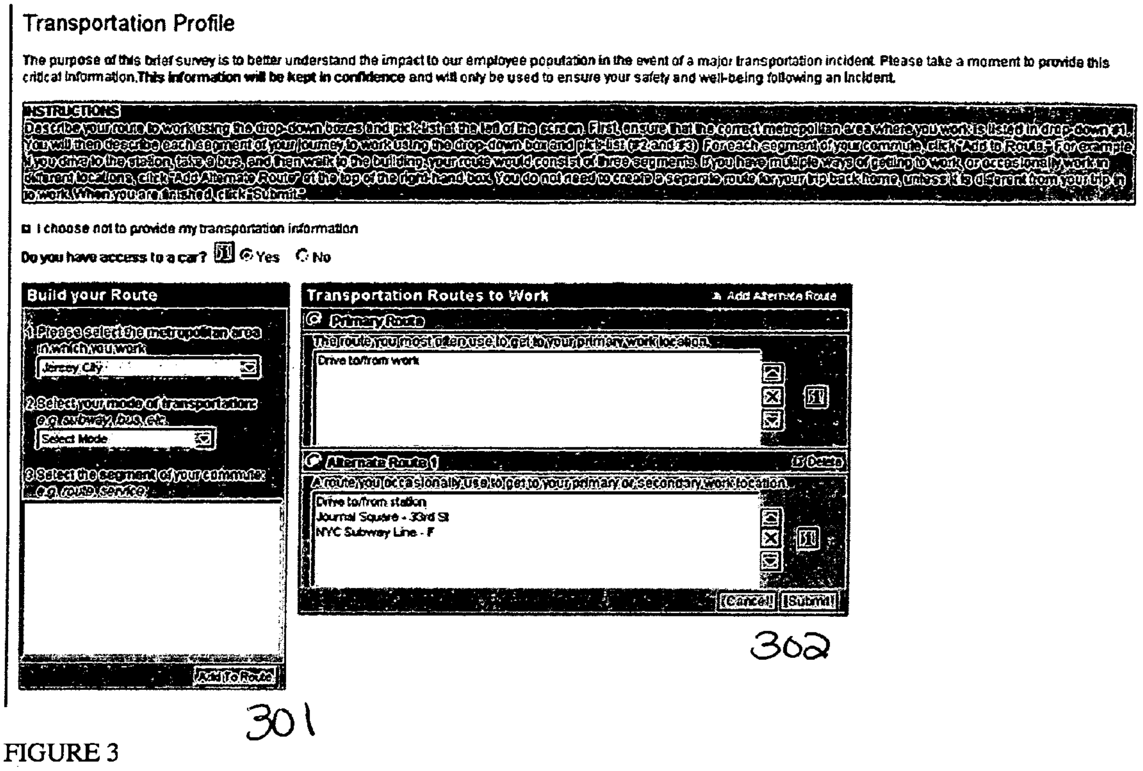
FIG. 3 is an exemplary user interface that may be used in accordance with a preferred embodiment of the present invention.
Figure 4:
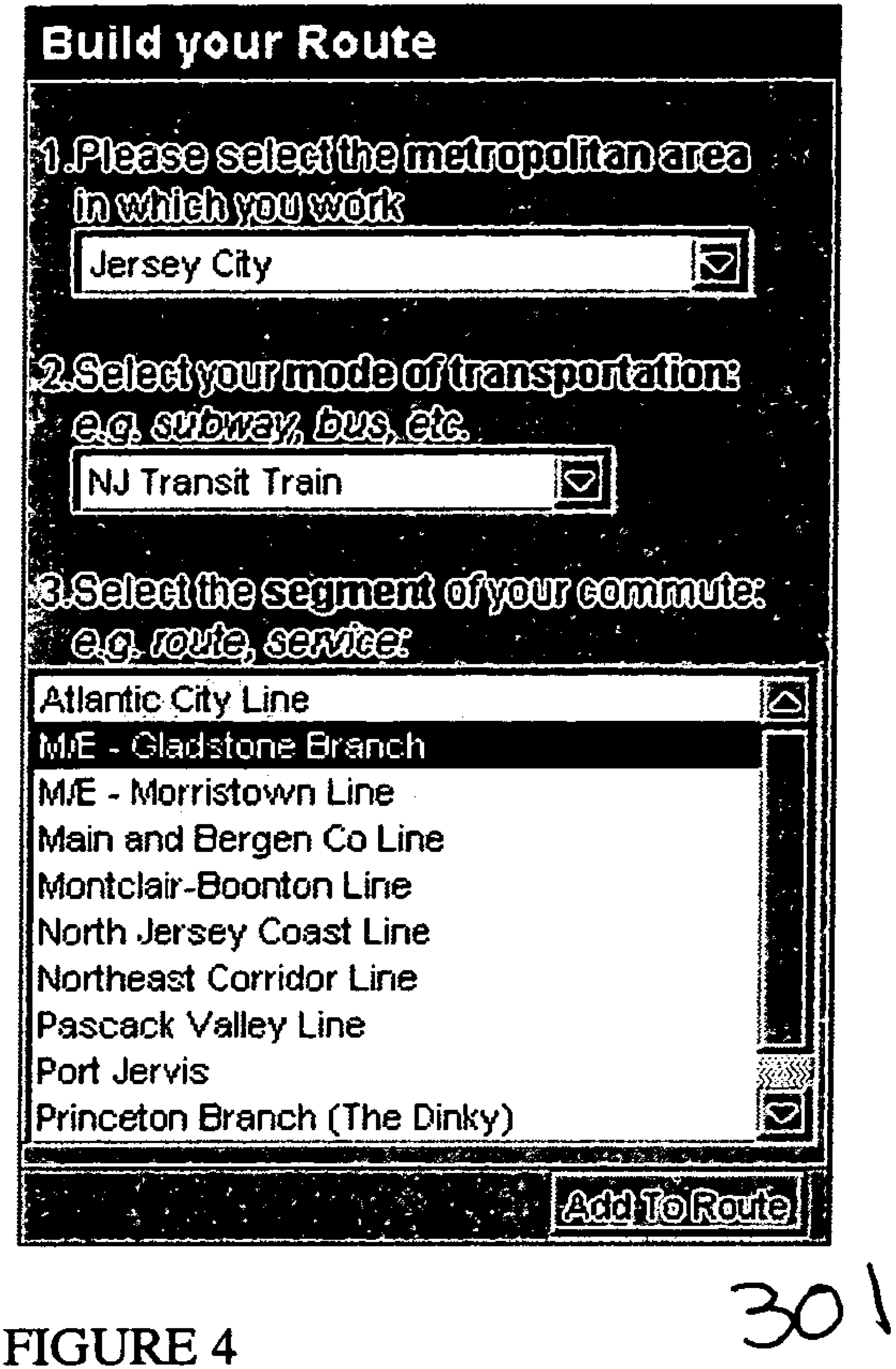
FIG. 4 is an exemplary user interface that may be used in accordance with a preferred embodiment of the present invention.
Figure 5:
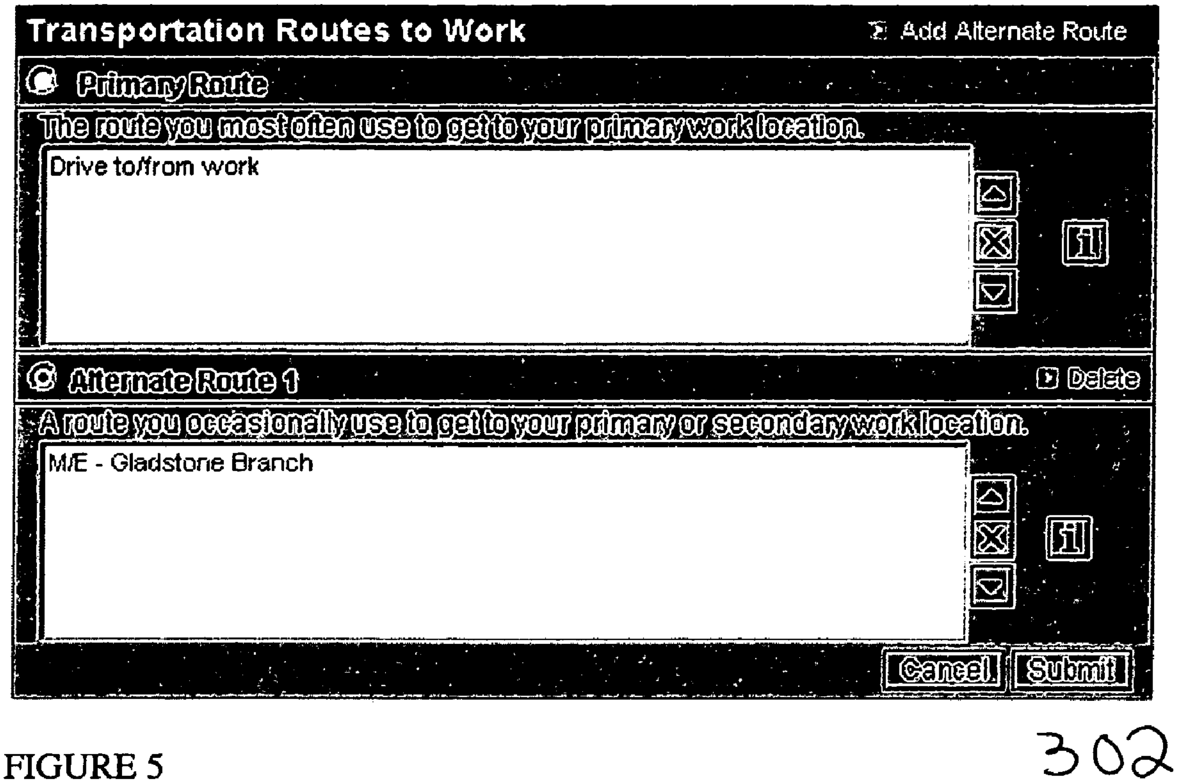
FIG. 5 is an exemplary user interface that may be used in accordance with a preferred embodiment of the present invention.

FIGS. 3, 4 and 5 are exemplary user interfaces that may be used in connection with the present invention. FIG. 3 illustrates an exemplary a user interface 300 that may be used by an employee or a consultant to build their personal commutation routes. FIG. 4 illustrates box 301 of FIG. 3, which allows an employee or consultant to select an appropriate segment based on his city and mode of transportation. FIG. 5 illustrates box 302 of FIG. 3, which lays out the segments in either the primary or alternate routes. Users can reorder segments and add or delete alternate routes.

Figure 6:
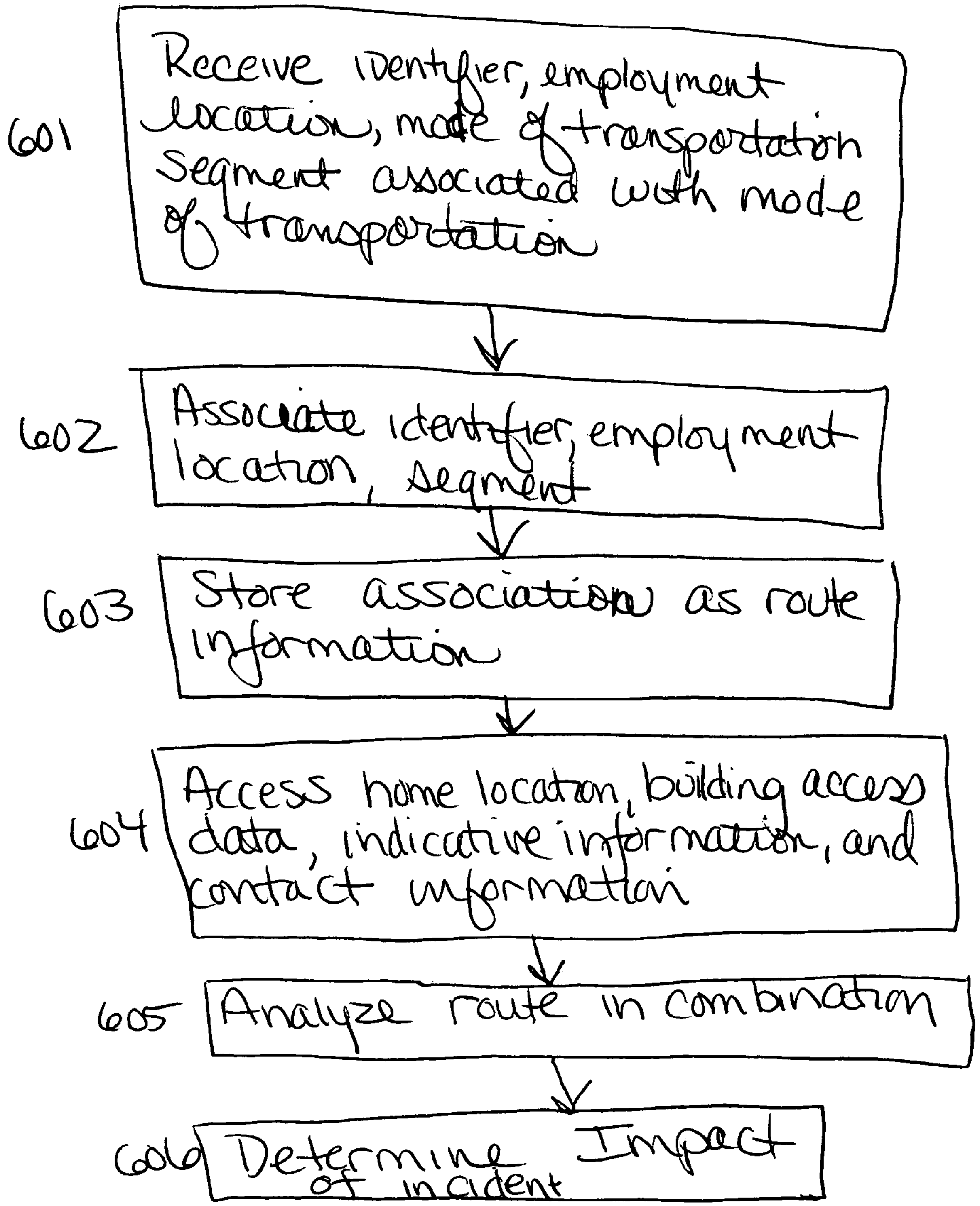
FIG. 6 is a flow chart illustrating a preferred embodiment of a method of the present invention.

FIG. 6 is a flow chart illustrating a preferred embodiment of a method of the present invention. In step 601, several items of information are received, including an identifier associated with an individual, an employment location for the individual, a mode of transportation used by the individual to travel to the employment location, and a segment associated with the mode of transportation. The identifier, the employment location, the mode of transportation and the segment are associated in step 602. The association is stored as route information in step 603. One or more of home location information for the individual, building access data for the individual, indicative information for the individual, and contact information for the individual are accessed in step 604. The route information is analyzed in combination with one or more of the home location information, the building access data, the indicative information, and the contact information, in step 605, to determine an impact on the individual of an incident effecting one or more of the employment location, the mode of transportation, and the segment in step 606. One or more of the foregoing steps may be performed by software running on a data processing apparatus.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method comprising:

receiving an identifier associated with an individual, an employment location for the individual, a mode of transportation used by the individual to travel to the employment location, and a segment associated with the mode of transportation;

associating the identifier, the employment location, the mode of transportation and the segment;

storing the association as route information;

accessing one or more of home location information for the individual, building access data for the individual, indicative information for the individual, and contact information for the individual; and analyzing the route information in combination with one or more of the home location information, the building access data, the indicative information, and the contact information to determine an impact on the individual of an incident effecting one or more of the employment location, the mode of transportation, and the segment.

2. The method of claim 1 wherein the route is indicated as one of a primary route and an alternate route.

3. A system comprising:

one or more servers that store an identifier associated with an individual, an employment location for the individual, a mode of transportation used by the individual to travel to the employment location, and a segment associated with the mode of transportation;

one or more databases that store: (i) an association among the identifier, the employment location, the mode of transportation and the segment, as route information; and (ii) one or more of home location information for the individual, building access data for the individual, indicative information for the individual, and contact information for the individual; and a processor that analyzes the route information in combination with one or more of the home location information, the building access data, the indicative information, and the contact information to determine an impact on the individual of an incident effecting one or more of the employment location, the mode of transportation, and the segment.

4. The system of claim 3 wherein the route is indicated as one of a primary route and an alternate route.

5. A computer-readable medium comprising instructions which, when executed by a processor, perform a method comprising:

receiving an identifier associated with an individual, an employment location for the individual, a mode of transportation used by the individual to travel to the employment location, and a segment associated with the mode of transportation;

associating the identifier, the employment location, the mode of transportation and the segment;

storing the association as route information;

accessing one or more of home location information for the individual, building access data for the individual, indicative information for the individual, and contact information for the individual; and analyzing the route information in combination with one or more of the home location information, the building access data, the indicative information, and the contact information to determine an impact on the individual of an incident effecting one or more of the employment location, the mode of transportation, and the segment.

6. The computer-readable medium of claim 5 wherein the route is indicated as one of a primary route and an alternate route.

* * * * *

UNITED STATES PATENT AND TRADEMARK OFFICE

CERTIFICATE OF CORRECTION

PATENT NO. : 7,228,226 B1

APPLICATION NO. : 11/605616

DATED : June 5, 2007

INVENTOR(S) : Jillian Paige Munro et al.

It is certified that error appears in the above-identified patent and that said Letters Patent is hereby corrected as shown below:

Title Page

On the front page, Item (75), change the third named inventor from “Patrick Anthony Alessi” to --Patrick Anthony Alesi--.

Signed and Sealed this

Seventh Day of August, 2007

JON W. DUDAS

*Director of the United States Patent and Trademark Office*